United States Patent [19]

Elwell

[11] Patent Number: 4,802,705

[45] Date of Patent: Feb. 7, 1989

[54] TRUCK BED LINER AND METHOD OF FORMING SAME

[75] Inventor: Dennis L. Elwell, Johnston, Iowa

[73] Assignee: Dee Zee, Inc., Des Moines, Iowa

[21] Appl. No.: 140,610

[22] Filed: Jan. 4, 1988

[51] Int. Cl.[4] .............................................. B62D 33/02
[52] U.S. Cl. ..................................... 296/39.2; 29/428
[58] Field of Search ........................... 296/39 R, 39 A;
148/11.5 A, 127 A, 13; 29/428

[56] References Cited

U.S. PATENT DOCUMENTS

| | | | |
|---|---|---|---|
| 2,898,146 | 8/1959 | Yadenfreund | 296/39 R |
| 3,682,712 | 8/1972 | Vernier | 148/13 |
| 3,990,922 | 11/1976 | Gullotti et al. | 148/13 |
| 4,279,439 | 7/1981 | Cantieri | 296/39 R |
| 4,336,963 | 6/1982 | Nix et al. | 296/39 R |
| 4,396,219 | 8/1983 | Cline | 296/39 R |

*Primary Examiner*—James B. Marbert
*Attorney, Agent, or Firm*—Henderson & Sturm

[57] ABSTRACT

The product and process of forming a flat mat as a liner for covering the exposed floor surface of a truck bed, the process comprising the flattening of a coiled strip of an aluminum alloy having up to 1.5% manganese therein and a thickness of from 0.063 to 0.100 inches, cutting and forming the flattened strip into a liner mat having certain dimensions rolling up the cut liner mat, heat treating the roll at 650° F. for 2 hours, cooling the heat treated roll at an ambient temperature, shipping the cooled roll in roll form and unrolling the shipped roll into a flat condition for subsequent installation onto the truck bed floor surface; the product comprising the mat formed thereby having the composition and physical characteristics set forth.

10 Claims, 1 Drawing Sheet

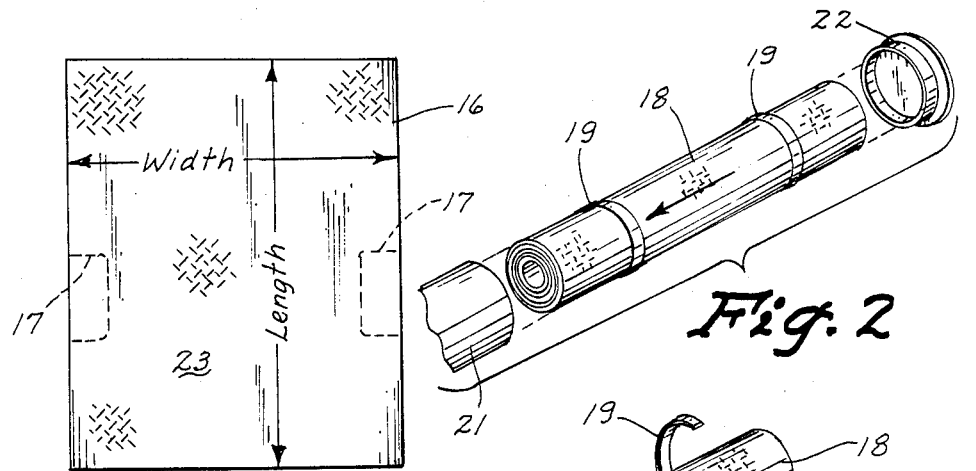
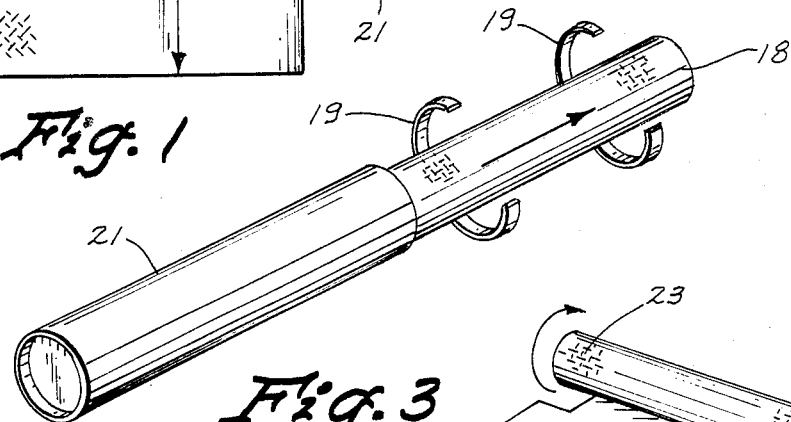
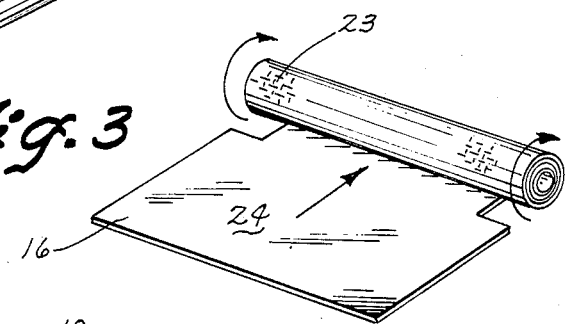
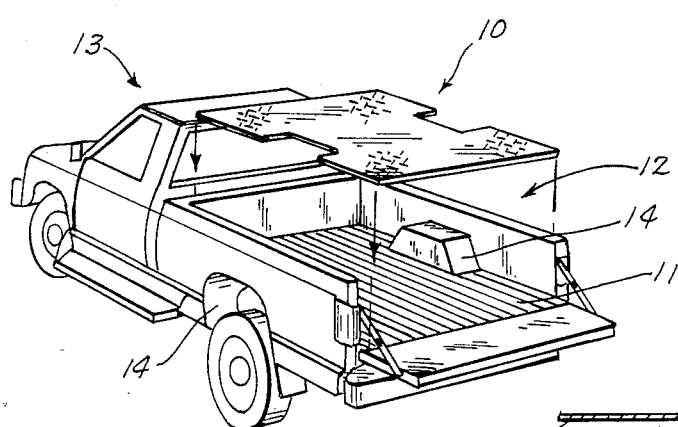
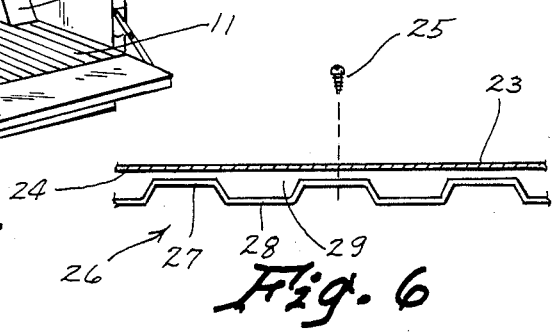

TRUCK BED LINER AND METHOD OF FORMING SAME

TECHNICAL FIELD

The present invention relates to pickup truck bed liners and more particularly to an aluminum liner removably attached to a conventional pickup truck bed, and to a method of forming the liner.

BACKGROUND ART

Removable liners for pickup truck beds are known. Such liners have previously been used to protect the painted surfaces of the truck bed from scratches, dents and the like so that the trucks may be used to haul cargo without damage to the truck structure or appearance. For example, U.S. Pat. No. 3,881,768 (issued May 6, 1975 to E. L. Nix) shows a pickup truck bed liner which is molded from rigid plastic or fiberglass. The rigid liner conforms to the bed of the truck and includes portions complementary to the bottom sides wheel wells and tailgate of the truck bed. The tailgate portion in the prior liner is effectively hinged to the bottom portion by a web material.

Flexible storage compartment liners for automobile trunks which may be fitted against the side walls and floor of the truck such as shown in U.S. Pat. No. 2,911,253, issued Nov. 3, 1959 to R. J. Dewey, are also known. However, such liners are hooked to the gutters of the trunk and are not suitable for prolonged use in exterior beds of pickup trucks.

Flexible storage compartment liners with inflatable side wall ribs for station wagons, such as described in U.S. Pat. No. 3,653,710, issued Apr. 4, 1972 to D. J. Barnard, are also known. While such an inflatable liner can be deflated to facilitate handling and storage, it is generally not suitable for prolonged use in the exterior bed of a truck.

U.S. Pat. No. 4,336,963 issued June 29, 1982 to E. L. Nix et al disclosed an integral, molded plastic truck bed liner with side liner walls with hook-shaped flanges at the top thereof for fitting over the corresponding top ledge and free rim of the truck bed side walls.

In the field of aluminum alloys, there is no known method of enabling a rolling up of a flat sheet, for example, of aluminum alloy, a shipment, for example of the rolled stock of aluminum alloy, and then unrolling of the rolled stock for use such that the unrolled sheet remains relatively flat.

To obtain the strength, durability and beauty of aluminum alloy for use as a truck bed liner, and to provide for a unique and improved process of obtaining and utilizing aluminum alloy in a rolled form for economy of transportation, this invention is directed.

DISCLOSURE OF THE INVENTION

The invention relates to a new and novel aluminum alloy truck bed liner having a substantially flat formation across the ribbed surface of the truck bed, and which provides full pickup truck bed protection, provides an exact fit for the owner's specific pickup, eliminates certain dampness problems causing deterioration of both bed and liner, provides the strength and long lasting quality of aluminum as the liner product, provides an economical manufacturing process for producing and shipping a truck bed liner composed of an aluminum alloy.

The invention relates further to: obtaining a coil of aluminum alloy having a 3003 alloy numerical description; flattening the coil into an elongated strip, cutting the strip into rectangular sheets, each having a desired length and width, including extra cutouts, if necessary; cold rolling each sheet into a roll of determined diameter most suitable for shipping purposes; heat treating the roll at a predetermined temperature and time; cooling the heated roll; and packaging the cooled roll for shipping purposes. After shipment, the customer removes the roll from the packaging, unrolls it to a relatively flat state—in which condition the roll remains, and installs the now again flat sheet into the truck bed, retaining the sheet to the bed by fasteners.

A trim strip at the rear end of the liner may be added to the liner rear edge, being secured through same, to provide for easier sliding of objects into and out of the truck bed.

It is an object of this invention to provide a new and novel truck bed liner.

It is another object of this invention to provide a new and novel method and process of manufacturing a truck bed liner out of aluminum alloy.

Yet another object of this invention is to provide a truck bed liner of metal, and which can be shipped to the consumer in a rolled form.

Another object of this invention is to provide a truck bed flat, solid liner which when fastened onto the truck bed, permits air to flow thereunder, thereby obviating dampness problems between the liner and the bed.

Still another object of this invention is to provide a truck bed liner of metal, specifically aluminum, which can be shipped to the user in rolled form, and which can be used by the consumer in flat form.

Another object of this invention is to provide a unique process of heat treating an aluminum alloy having some manganese therein, such that the aluminum, in sheet form, can be shipped in a rolled form, unrolled, and used by the customer in a flat form or condition.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a plan view of a flat sheet of aluminum alloy prior to being processed and heat treated for use as a truck bed liner;

FIG. 2 is a perspective view of the sheet of FIG. 1 after processing, rolling and heat treating, ready for insertion into a shipping container;

FIG. 3 is a perspective view similar to FIG. 2 and showing removal of the rolled aluminum truck bed liner from its shipping container;

FIG. 4 is a perspective view showing the aluminum being unrolled, as by the user, prior to installation;

FIG. 5 is a perspective view showing the flat sheet of aluminum alloy, having been received and unrolled, and showing by exploded manner above the truck bed, the liner ready for placement on the bed floor for installation; and FIG. 6 is a fragmentary sectional view showing the liner flat on the truck bed and ready for fastening thereto.

BEST MODE AND PROCESS FOR CARRYING OUT THE INVENTION

Referring to the drawings, a liner indicated generally at (10) in FIG. 5 is illustrated for protecting the flat, or in in this instance corrugated exposed floor (11) of a truck bed (12) as a part of a conventional pickup type truck (13). It is seen that the rear wheel wells (14) protrude upwardly and into the general rectangular outline of the truck bed (12).

The liner (10) was originally comprised of a coil (not shown) of an aluminum alloy including up to 1.5% manganese having a thickness of from 0.63 to 0.100 inches, preferably 0.080 inches, the coil having a length considerably longer than the liner (10), and with a predetermined width.

The coil is unrolled and the strip flattened by conventional means, the resulting flattened strip then cut—as by plasma arc cutting equipment for example, into a plurality of mats (16) (FIG. 1), each having a predetermined width and length, and with cut-outs (17) for the wheel wells, all depending upon the size and configuration of the truck bed (12) to be covered. Other notches (not shown) may be cut out from the strip to accommodate various types of truck bed arrangements.

Each mat (16) is then rolled into a roll (18) (FIG. 2) of a size from 10 to 11 inches, not more than 11 inches, and bands (19) are fastened about the roll (18) to retain its shape. The roll (18) is then placed in a heating chamber where it is heated at a minimum of 650° F. for at least 2 hours, and up to 2½ hours. In this manner, the work introduced into the aluminum alloy by the rolling process—which work would ordinarily prevent the mat (16) from again assuming a flat condition, is removed. After being heat treated, the roll (18) is cooled sufficiently for handling, and is inserted into a shipping container (21) (FIG. 2) provided therfore, and with the container (21) closed with a cap (22).

The container (21) is then shipped to a destination for the ultimate user, who releases the bands (19) (FIG. 3), removes the roll (18) and unrolls it into the flattened mat (16) form (FIG. 4). It will be noted that the mat material may have a Brite-Tread finish on one surface (23) with the opposite surface (24) smooth. With the Brite-Tread surface (23) up, the mat (16) is then placed over the truck bed floor (11) (FIG. 5) and fastened thereto to prevent movement by fasteners (25).

Referring to FIG. 6, should the floor (11) have corrugations (26) with upper levels (27) and lower levels (28), it is readily seen that when the relatively flat mat (16) is fastened down to the floor (11), air flow is permitted through all of the air channels (29) formed thereby for preventing dampness.

The particular size roll (18) and container (21) provide for expeditious and economical shipping for the manufacturer, resulting in savings for both manufacturer and consumer.

From the aforementioned product and process description, it can readily be seen that all objectives as to the instant invention are attained. While the invention has been described with reference to a particular embodiment and process, other changes or modifications may be suggested to those skilled in the art without departing from the inventive concept or scope of the appended claims.

I claim:

1. A liner for protecting the corrugated or flat exposed floor of a truck bed comprising a flat mat of an aluminum alloy conforming generally to the outline of the truck bed, said mat originally formed in a coil, said coil comprising a strip having a length considerably longer than said mat, said coil having been flattened and formed into a plurality of mats of identical shape, each of said mats again formed into a roll for shipping purposes.

2. The liner of claim 1 wherein said liner includes up to about 1.5% manganese and has a thickness of from 0.063 to 0.100 inches.

3. The liner of claim 2 wherein said liner has been heat treated in a roll form for shipping purposes to 650° F. for a minimum of 2 hours, then permitted to cool.

4. The liner of claim 3 wherein said cooled roll is banded and placed in a carton for shipping purposes.

5. The liner of claim 4 wherein said shipped roll is adapted to be unrolled into a substantially flat condition.

6. The liner of claim 5 wherein said liner, when installed onto a corrugated truck bed, forms a plurality of spaced air spaces between said liner and the truck bed whereby air may flow beneath said liner and over predetermined portions of the truck bed for installation, said flat condition retained without further and additional means.

7. A process of forming a liner for installation onto a flat exposed floor surface of a truck bed, process comprising the steps of forming an elongated strip of aluminum alloy having a predetermined thickness and width into a coil;
unrolling said coil and flattening said strip;
cutting said strip into liner mats, each of a predetermined shape;
rolling each said mat into a roll of a predetermined size;
subjecting each rolled mat to a temperature higher than ambient for a predetermined time;
cooling said heated rolled mat;
packaging said cooled mat for shipment;
unpackaging and unrolling said shipped mat into a flat condition; and
installing said flat mat onto the truck bed floor surface.

8. The process of claim 7 and further wherein said strip has a composition including up to 1.56 of manganese.

9. The process of claim 8 and further wherein said strip has a thickness of from 0.063 to 0.100 inches.

10. The process of claim 9 and further wherein said heat treating comprises placing said rolled mat of a predetermined size into a heating chamber, bringing the temperature of the chamber up to 650° F. and maintaining said temperature of 650° F. for at least 2 hours.

* * * * *